(12) United States Patent
Smith

(10) Patent No.: US 7,870,390 B2
(45) Date of Patent: *Jan. 11, 2011

(54) DATA WATERMARKS CREATED BY USING AN UNEVEN SAMPLING PERIOD

(75) Inventor: Gordon James Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1378 days.

This patent is subject to a terminal disclaimer.

(21) Appl. No.: 11/122,804

(22) Filed: May 5, 2005

(65) Prior Publication Data

US 2005/0198505 A1    Sep. 8, 2005

Related U.S. Application Data

(63) Continuation of application No. 09/435,789, filed on Nov. 8, 1999, now Pat. No. 7,051,203.

(51) Int. Cl.
*H04L 9/00* (2006.01)

(52) U.S. Cl. .......................... 713/168; 713/176; 726/2; 380/38

(58) Field of Classification Search ................ 713/168, 713/176; 726/2; 380/28, 36, 38, 39, 46, 380/54, 261; 382/251
See application file for complete search history.

(56) References Cited

U.S. PATENT DOCUMENTS

| | | | |
|---|---|---|---|
| 4,773,092 A | | 9/1988 | Huang |
| 5,225,904 A | * | 7/1993 | Golin et al. ............ 375/240.12 |
| 5,245,661 A | * | 9/1993 | Lee et al. .................... 380/268 |
| 5,687,236 A | | 11/1997 | Moskowitz et al. |
| 5,822,432 A | | 10/1998 | Moskowitz et al. |
| 5,889,868 A | | 3/1999 | Moskowitz et al. |

* cited by examiner

*Primary Examiner*—Kimyen Vu
*Assistant Examiner*—Baotran N To
(74) *Attorney, Agent, or Firm*—Matthew J. Bussan

(57) ABSTRACT

Input signals are electronically watermarked using an uneven or non-uniform sampling rate. The uneven or non-uniform sampling may be pseudo-random. The uneven or non-uniform sampling meets the Nyquist criterion so that aliasing and loss of content are avoided. The resulting sampling pattern in the sampled data is detectable by a comparison with the original source data.

9 Claims, 7 Drawing Sheets

DATA WATERMARKS CREATED BY USING AN UNEVEN SAMPLING PERIOD

CROSS-REFERENCE TO RELATED APPLICATION

This patent application is a continuation application of U.S. patent application Ser. No. 09/435,789, filed Nov. 8, 1999 now U.S. Pat. No.7,051,203, entitled "DATA WATERMARKS CREATED BY USING AN UNEVEN SAMPLING PERIOD", which is hereby incorporated by reference.

BACKGROUND OF THE INVENTION

1. Field of the Invention

The invention relates to the field of signal encoding, and in particular, to a signal encoding method and apparatus useful for digital watermarking, encryption, and the like.

2. Background Information

With the advent of computer networks and digital multimedia, protection of intellectual property has become a prime concern for creators and publishers of digitized copies of copyrightable works, such as musical recordings, movies, and video games.

What differentiates the "digital marketplace" from the physical marketplace is the absence of a widely accepted scheme that establishes responsibility and trust in the authenticity of goods. For physical products, corporations and governments mark the goods and monitor manufacturing capacity and sales to estimate loss from piracy. There also exist reinforcing mechanisms, including legal, electronic, and informational campaigns to better educate consumers.

One method of protecting copyrights in the digital domain is to use "digital watermarks". Digital watermarks can be used to mark each individual copy of a digitized work with information identifying the title, copyright holder, and even the licensed owner of a particular copy.

Digital watermarks provide creators and publishers of digitized multimedia content localized, secured identification and authentication of that content. The problem of piracy is clearly a disincentive to the digital distribution of copyrighted works. The establishment of responsibility for copies and derivative copies of such works is invaluable. In considering the various forms of multimedia content, whether "master," stereo, NTSC video, audio tape or compact disc, tolerance of quality degradation will vary with individuals and affect the underlying commercial and aesthetic value of the content.

The watermarks can serve to allow for secured metering and support of other distribution systems of given media content and relevant information associated with them, including addresses, protocols, billing, pricing or distribution path parameters, among the many things that could constitute a "watermark." When marked with licensing and ownership information, responsibility is created for individual copies where before there was none.

Digital watermarks can be encoded with random or pseudo random keys, which act as secret maps for locating the watermarks. These keys make it impossible for a party without the key to find the watermark—in addition, the encoding method can be enhanced to force a party to cause damage to a watermarked data stream when trying to erase a random-key watermark.

U.S. Pat. No. 5,822,432 (Moskowitz et al.) issued Oct. 13, 1998, "Method for human-assisted random key generation and application for digital watermark system" discloses (paraphrasing the Abstract) a method for the human-assisted generation and application of pseudo-random keys for the purpose of encoding and decoding digital watermarks to and from a digitized data stream. A pseudo-random key and key application "envelope" are generated and stored using guideline parameters input by a human engineer interacting with a graphical representation of the digitized data stream. Key "envelope" information is permanently associated with the pseudo-random binary string comprising the key. Key and "envelope" information are then applied in a digital watermark system to the encoding and decoding of digital watermarks. Improvements to the methods of encoding and decoding digital watermarks are disclosed: separation of the encoder from the decoder, increased information capacity relative to spread spectrum methods, destruction of content resulting from attempts to erase watermarks, detection of presence of watermarks without ability to access watermark information, multi-channel watermark capability, use of various classes of keys for watermark access control, support for alternative encoding, decoding, or other component algorithms, use of digital notary to authenticate and time stamp watermark certificates.

U.S. Pat. No. 5,889,868 (Moskowitz et al.) dated Mar. 30, 1999 "Optimization methods for the insertion, protection, and detection of digital watermarks in digitized data" discloses (paraphrasing the Abstract) implementations of digital watermarks to various transmission, distribution and storage mediums taking into consideration the nature of digitally-sampled audio, video and other multimedia works. Watermark application parameters are adapted to the individual characteristics of a given digital sample stream. Watermark information is either carried in individual samples or in relationships between multiple samples, such as in a waveform shape. More optimal models are obtained to design watermark systems that are tamper-resistant given the number and breadth of existent digitized sample options with different frequency and time components. Quality of a given content signal may be maintained as it is mastered, with the watermark suitably hidden, taking into account usage of digital filters and error correction. The quality of the underlying content signals can be used to identify and highlight advantageous locations for the insertion of digital watermarks. The watermark is integrated as closely as possible to the content signal, at a maximum level to force degradation of the content signal when attempts are made to remove the watermarks.

Some methods that could be used for digital watermarking include amplitude or phase encoding or data encryption. However, for amplitude encoding, it is difficult to preserve a signal's characteristics and yet have a robust scheme that would not alter the signal envelope to the point that the watermark would distort the signal in a noticeable way. Phase encoding of a watermark would also destroy the fidelity of video and audio signals and could easily be detected (as could amplitude encoding).

A watermark could be included by signal encryption, but the encryption and decryption process are time consuming for larger data blocks and requires more expensive hardware.

Therefore, a need exists for a watermarking method and apparatus that overcomes the limitations and problems noted above.

It is known to generate a binary sequence for scrambling distributed samples and sampling the sequence at non-uniform sampling time intervals, descrambling using a comparator. For example, U.S. Pat. No. 5,245,661 (Lee et al.) issued Sep. 14, 1993, discloses (Abstract) a distributed sample scrambling system comprising scrambler and a descrambler. The scrambler includes a first shift register generator for generating a scrambler sequence, an exclusive OR gate for generating a scrambled bit stream by adding the binary sequence to a scrambler input bit stream, and a first sampling unit for sampling the scrambler sequence at non-uniform sampling intervals. The descrambler includes a second shift register generator for generating a descrambler sequence, a second sampling unit for sampling the descrambler sequence at the same sampling times, a comparator for comparing the samples of the descrambler sequence to the samples of the scrambler sequence in order to determine whether the samples of both the descrambler and the scrambler are identical, a correction circuit for outputting correction signals corresponding to the comparison results of the comparator to the second shift register generator, and an exclusive OR gate for generating a descrambled bit stream by adding the descrambler sequence to the scrambled bit stream of the scrambler.

It is also known to scramble an input speech signal via an analog-to-digital converter which samples it at the Nyquist rate. For example, U.S. Pat. No. 4,773,092 (Huang) issued Sep. 20, 1988, discloses (Abstract) a band scrambler which processes only time domain samples is described. The band scrambler has the effect of dividing the input signal spectrum into N sub-bands. The N sub-bands are permuted such that the r th band is mapped onto the k.r th band modulo N, where N is a constant of the scrambler and k is the key which is variable in the range $2<k<N-1$.

In "The Shannon Sampling Theorem—Its Various Extensions and Applications: A Tutorial Review" (Abdul J. Jerri, Proc. Of the IEEE, Vol. 65, No. 11, November 1977, pages 1565 to 1598) at page 1575, mention is made of the so-called "folk-theorem" relating to sampling. Briefly, the folk-theorem states that any analog signal can be sampled with a non-uniform (or uneven) sampling period without losing content or risking aliasing, as long as the average sampling frequency exceeds the Nyquist rate, i.e., the number of samples per unit time is at least twice the highest frequency present in the analog signal being sampled. For example, CD-quality audio signals are typically sampled at 44,100 Hz. According to the theorem, an uneven sampling period must be no greater than about 23 microseconds on the average in order to retain content and avoid aliasing, assuming the highest frequencies in the audio signal are below 22,050 Hz, i.e., the upper end of the range of audible frequencies. Therefore, according to the theorem, it is possible to digitize an analog signal at an uneven rate, or to resample an existing digital signal at an uneven rate, without losing information content or risking aliasing if the criterion of the folk theorem is met. However, approximately 99.999% of digital signal processing (DSP) applications, textbooks, and devices rely on a fixed sampling period. When the sampling period is not fixed, the textbook methods for estimating frequency spectrums, filtering, etc., are incorrect.

SUMMARY OF THE INVENTION

It is, therefore, a principle object of this invention to provide a method and apparatus for providing data watermarks created by using an uneven sampling period.

It is another object of the invention to provide a method and apparatus that solves the above mentioned problems so that data watermarks are provided without loosing fidelity of the original analog signal, and without requiring a time consuming and/or complicated process and corresponding apparatus.

These and other objects of the present invention are accomplished by the method and apparatus disclosed herein.

According to an aspect of the invention, analog input data is sampled by an analog-to-digital (A/D) converter at an uneven rate.

According to an aspect of the invention, the resulting output is an unevenly sampled digital version of the analog input data.

According to an aspect of the invention, the period between samples is altered in an uneven pattern that is later detectable by comparison with the source data.

According to an aspect of the invention, the analog input data to which the uneven sampling is applied is speech.

According to another aspect of the invention, the sampling period is not the same for all samples in the output data.

According to another aspect of the invention, a sampling period is determined using a pseudo-random sequence generator with a given seed (S).

According to another aspect of the invention, the random sequence is used to create a delay that alters the sampling time of an analog-to-digital (A/D) converter.

According to another aspect of the invention, a fixed rate clock is used to generate a sequence of pseudo-random numbers and these values in turn cause a certain delay between the clock timing and sampling frequency.

According to another aspect of the invention, the sequence of pseudo-random numbers are stored in memory.

According to another aspect of the invention, in an authentication, watermark verification, process, unevenly sampled candidate data and the original data are normalized in order to reduce the effect of any gain difference.

According to another aspect of the invention, the normalization is a division of the samples by the maximum in the data sequence, which is robust in the presence of additive noise.

According to another aspect of the invention, to check for a watermark, i.e., whether the candidate data was created using the same pseudo-random generator and seed (S), the mean square difference (MSD) between the two data streams is examined.

According to another aspect of the invention, if the candidate data has the correct watermark, this is detected as a small MSD.

According to another aspect of the invention, counterfeit watermarks (or the lack of a watermark) would be indicated by an abnormally large MSD.

According an aspect of the invention, there is provided an apparatus for implementing the process according to the invention.

According an aspect of the invention, when used in a data transmission application, the addition of a watermark to an audio or video data file is performed by using an uneven sampling period before transmission. This type of watermark is not detectable in the data itself at the receiver. The detection of watermark is only possible if the original source data and the pattern used to create the uneven period is available.

According an aspect of the invention, the invention can be used to determine if audio and video data is authentic. The invention can also be used to watermark image data if aliasing is not present.

The above and other advantages to using a watermark based on uneven sampling, as well as other aspects of the invention will become apparent from the detailed description set forth below.

DETAILED DESCRIPTION OF THE PREFERRED EMBODIMENT(S)

The invention will now be described in more detail by way of example with reference to the embodiment(s) shown in the accompanying figures. It should be kept in mind that the following described embodiment(s) is/are only presented by way of example and should not be construed as limiting the inventive concept to any particular physical configuration.

Figure 1:
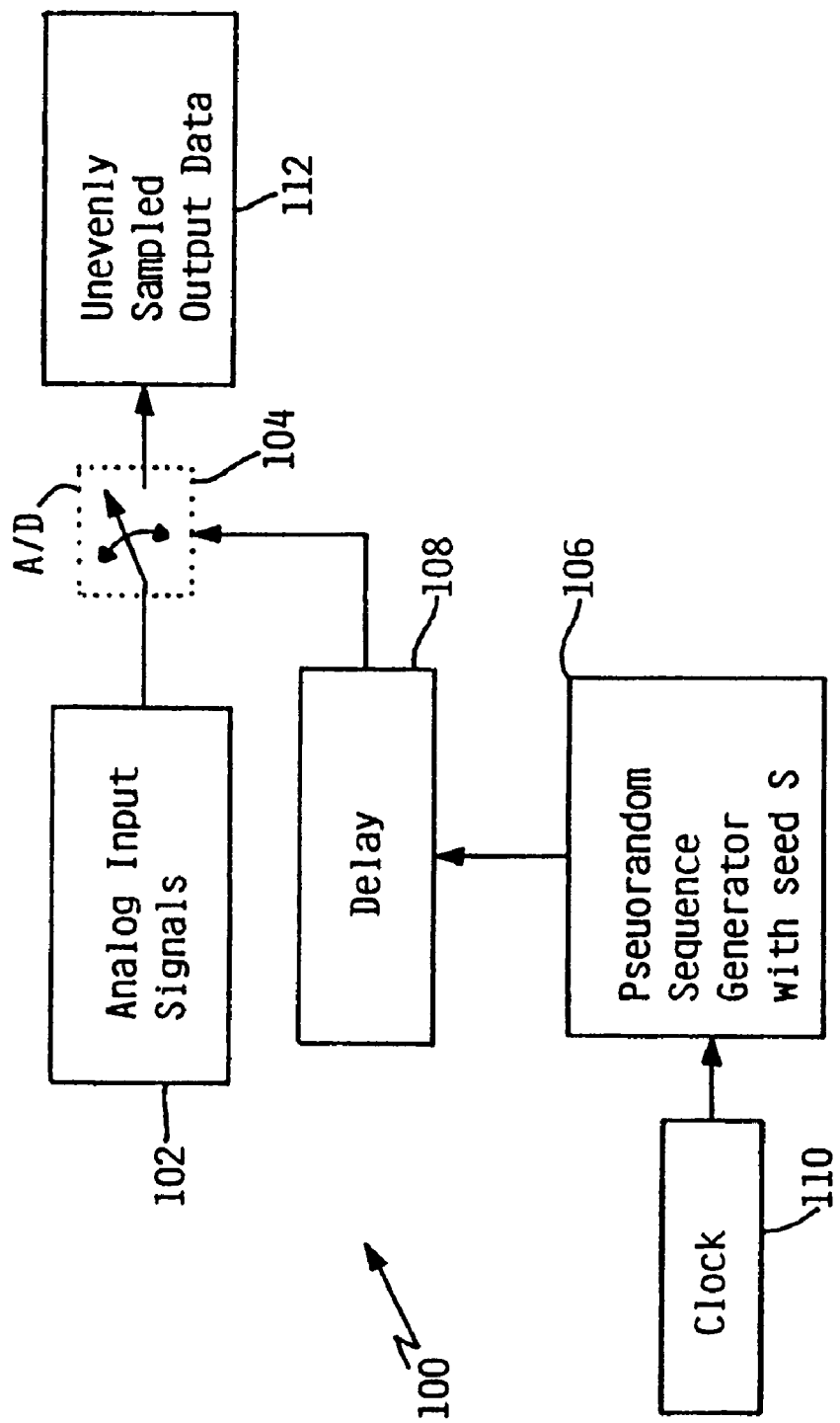
FIG. 1 is a block diagram showing one implementation of creating watermarked data according to an exemplary embodiment of the present invention.

FIG. 1 is a block diagram showing the creation of watermarked data, according to an exemplary embodiment of the invention. Analog input signals 102, for example, speech or audio signals, are sampled by an analog-to-digital converter 104 (A/D) at a non-uniform or uneven rate. Although this sampling rate is non-uniform or uneven, the average sampling period meets the Nyquist criteria according to the "folk theorem" described earlier.

In particular, the sampling period in the exemplary embodiment is determined using a pseudo-random sequence generator 106 with a given seed (S). The random sequence output is used to create a delay 108 that alters the sampling time of the A/D converter 104. For illustration purposes, a fixed rate clock 110 is used in generating a sequence of pseudo-random numbers, and these values in turn are used to cause a certain delay between the clock timing and sampling frequency. The result is unevenly sampled output data 112, a digital version of the analog input signals 102. Of course, other methods for altering the sampling time of the A/D converter 104 could be used, and the same are considered within the spirit and scope of the invention.

Alternatively, the sequence of pseudo-random numbers used to vary the sampling period could advantageously be stored in memory (not shown). If stored in non-volatile memory, e.g., electrically programmable read only memory (EPROM), a transmitter and a receiver could easily be provided with the identical set of pseudo-random numbers for encoding and decoding. Of course, besides EPROM, other storage devices and/or media could be used, such as a disk drive, tape drive, CD-ROM, etc., as would be apparent to one cessing (DSP) applications, textbooks, and devices rely on a fixed sampling period. When the sampling period is not fixed, the textbook methods for estimating frequency spectrums, filtering, etc., are incorrect.

Therefore, the uneven or non-uniform sampling may not have been considered to have much practical value to those skilled in the art.

However, according to a feature of the invention, from an end user standpoint, applied to audio or video reception, for example, it does not matter if the sampling period is uniform or not, as long as the average sampling period meets the Nyquist criteria.

Although a pseudo-random process has been described above, it is noted that, a fundamental principle of the invention is to alter the period between samples in some uneven pattern that is later detectable by comparison with the source data. Therefore, other methods and apparatus could be used to provide a non-uniform or uneven sampling, and the same would be considered within the spirit and scope of the invention.

Figure 2:
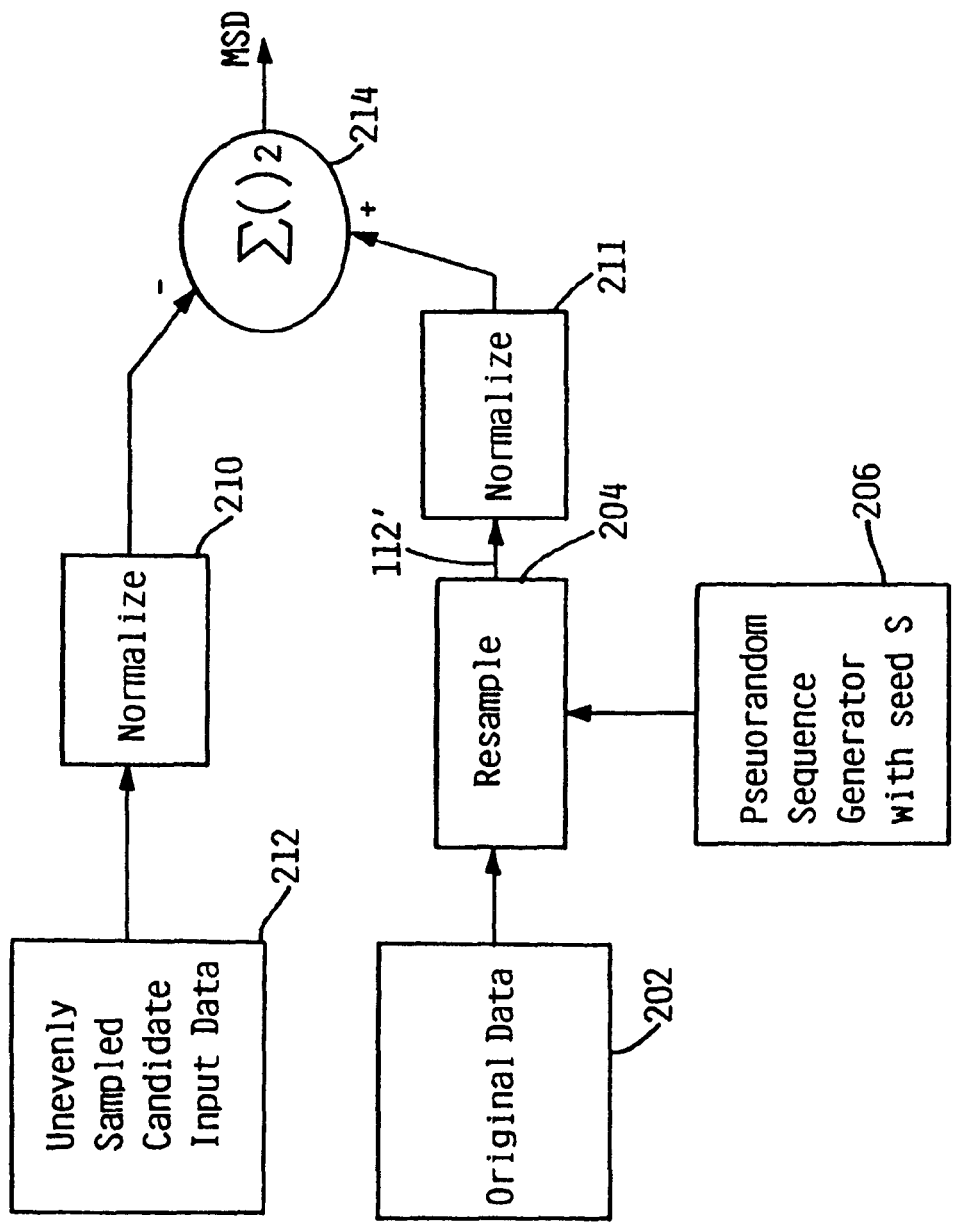
FIG. 2 illustrates an authentication (watermark verification) process according to an exemplary embodiment of the invention.

In FIG. 2, an authentication, watermark verification, process is shown, according to an exemplary embodiment of the invention. Both the unevenly sampled candidate input data 212 and the original data 112', i.e., the original analog input signals 202 resampled 204 using pseudo-random sequence generator with seed (S) 206, are normalized by respective blocks 210 and 211, in order to reduce the effect of any gain difference which might be present.

The normalization used in a simulation was a division of the samples by the maximum in the data sequence. This method appeared to be very robust in the presence of additive noise. However, other normalization techniques known to those skilled in the art would be applicable and considered within the spirit and scope of the invention. For example, one could subtract the mean value of a sequence from each sample in the sequence for normalization.

To check for a watermark, i.e., to check whether the candidate data was created using the same pseudo-random generator and seed (S), the mean square difference (MSD) between the two normalized data streams is produced 214 and examined.

If the candidate data 212 has the correct watermark, this is easily detected as a small MSD. Counterfeit watermarks, or the lack of a watermark at all, would be indicated by an abnormally large MSD.

Of course there could be other ways of comparing the data streams to detect differences, as would be apparent to those skilled in the art, and these are considered to be within the spirit and scope of the invention. Many known pattern recognition techniques exist and are used in such technologies as speech recognition, for example.

As mentioned earlier, any analog signal can be sampled with a non-uniform, or uneven sampling period without aliasing or loss of content, as long as the average sampling frequency exceeds the Nyquist rate. In the case of CD-quality audio signal, which is typically sampled at 44,100 Hz, the uneven sampling period should be no greater than about 23 microseconds on the average in order to avoid aliasing. An analog signal can be digitized at an uneven rate (or an existing digital signal resampled at an uneven rate) without losing information content or risking aliasing if, according to the folk theorem, the above criterion is met.

uniform sampling period of the original data is known. This is because it is generally impossible to deduce the inherent sampling rate of any digital signal sequence from the samples themselves.

The hidden nature of the sampling period makes it an ideal carrier of information that is known only by the source. If the data is altered at a later time by cutting and pasting, for example, the inherent pattern of the sampling period of the original data will have been altered. This will destroy the watermark, a condition that can be detected with this invention.

As noted earlier, using the existing data encryption techniques is slow and requires more expensive hardware than the solution given by this invention.

An alternative embodiment for detecting a signal which has been sampled unevenly will now be described with reference to FIGS. 3 and 4. For the case of a pure tone sampled digitally at a non-uniform or uneven rate, there are additional frequencies besides the pure frequency tone that appear when a frequency analysis, such as a conventional Fourier transform of the digitized signal is examined. The frequencies of these "extra" spectral components can be used to identify that a particular pattern of uneven sampling has been used when the original signal was digitized. This method is useful, for example, when it is possible to include within a transmission, certain portions which contain pure tone frequencies that have been unevenly sampled.

As an example, consider the following evenly sampled sine wave sequence of length 4096, $$y=\sin\{(0:16:4095)*2\pi/512\}$$

Forming an unevenly sampled version of the sequence is accomplished, for example, by shifting the location of the samples by a repetitive pattern, referred to as the uneven sampling pattern, which is, for example, $\{2, -6, -6, 2\}$. Thus, rather than using sample indices of $\{0, 16, 32, 48 \ldots\}$, the unevenly sampled sine wave uses samples $\{2, 10, 26, 50, 66, \ldots\}$. The unevenly sampled version of y is labeled: $y_{UE}$ and both signals y and $y_{UE}$, are plotted in FIG. 3.

Figure 3:
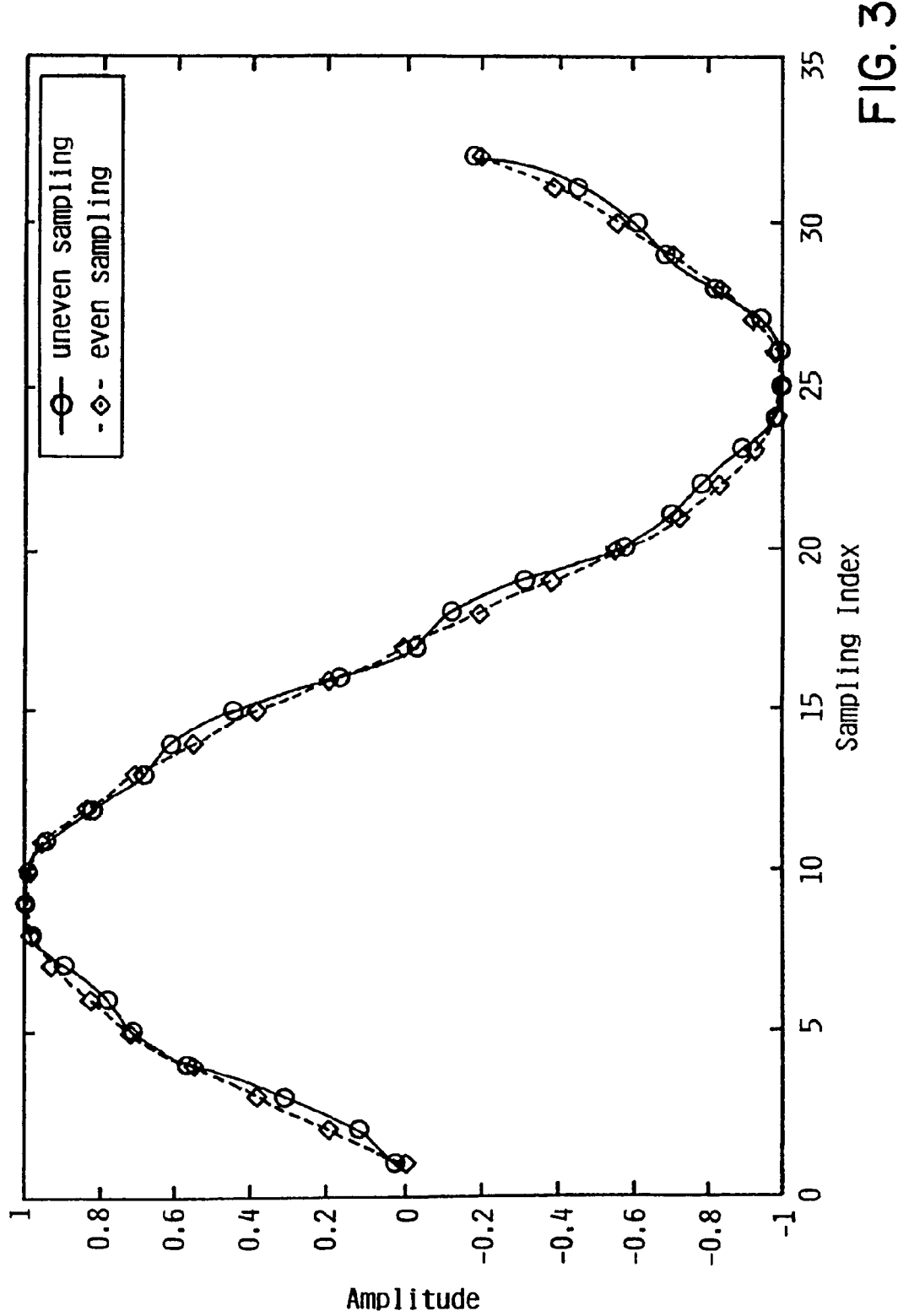
FIG. 3 is a graph of the amplitude versus sampling index for approximately one period of an evenly and unevenly sampled sine wave.

FIG. 3 is a graph of the amplitude versus sampling index for approximately one period of an evenly and unevenly sampled sine wave. In FIG. 3, approximately 1 period of an evenly and unevenly sampled sine wave is shown. It should be noted that there is a fairly good agreement that would normally be virtually undetectable in an audio, video, or image passage.

However, in order to properly determine the frequency content of $y_{UE}$, a conventional Discrete Fourier Transform (or a Fast Fourier Transform—FFT) cannot be used. Methods that better approximate the true spectrum of $y_{UE}$ include the Lomb Method (see Lomb, N. R. "Least-squares frequency analysis of unequally spaced data", Astrophysics and Space Science, 1976, pp. 447-462.), and also those proposed by Yen (see Yen, J. L., "On the nonuniform sampling of bandwidth limited signals", IRE Trans. Circuit Theory, vol. CT-3, pp. 251-257, Dec. 1956) and Press (see Press, W. H. and Rybicki, G. B. "Fast Algorithm for spectral analysis of unevenly sampled data", Astrophysical Journal, 1989, 338,277-280).

If a conventional Fast Fourier Transform (FFT) is taken of $y_{UE}$, then phantom frequencies will appear in the spectrum that are not present in the FFT spectrum of the evenly sampled sine wave, y. These phantoms are easily detected by taking the FFT of a pure tone candidate sequence and looking for values that are greater than zero in the spectrum besides the pure tone frequency. Thus, the presence of these phantom frequencies is an indication that an uneven sampling has been used.

Figure 4:
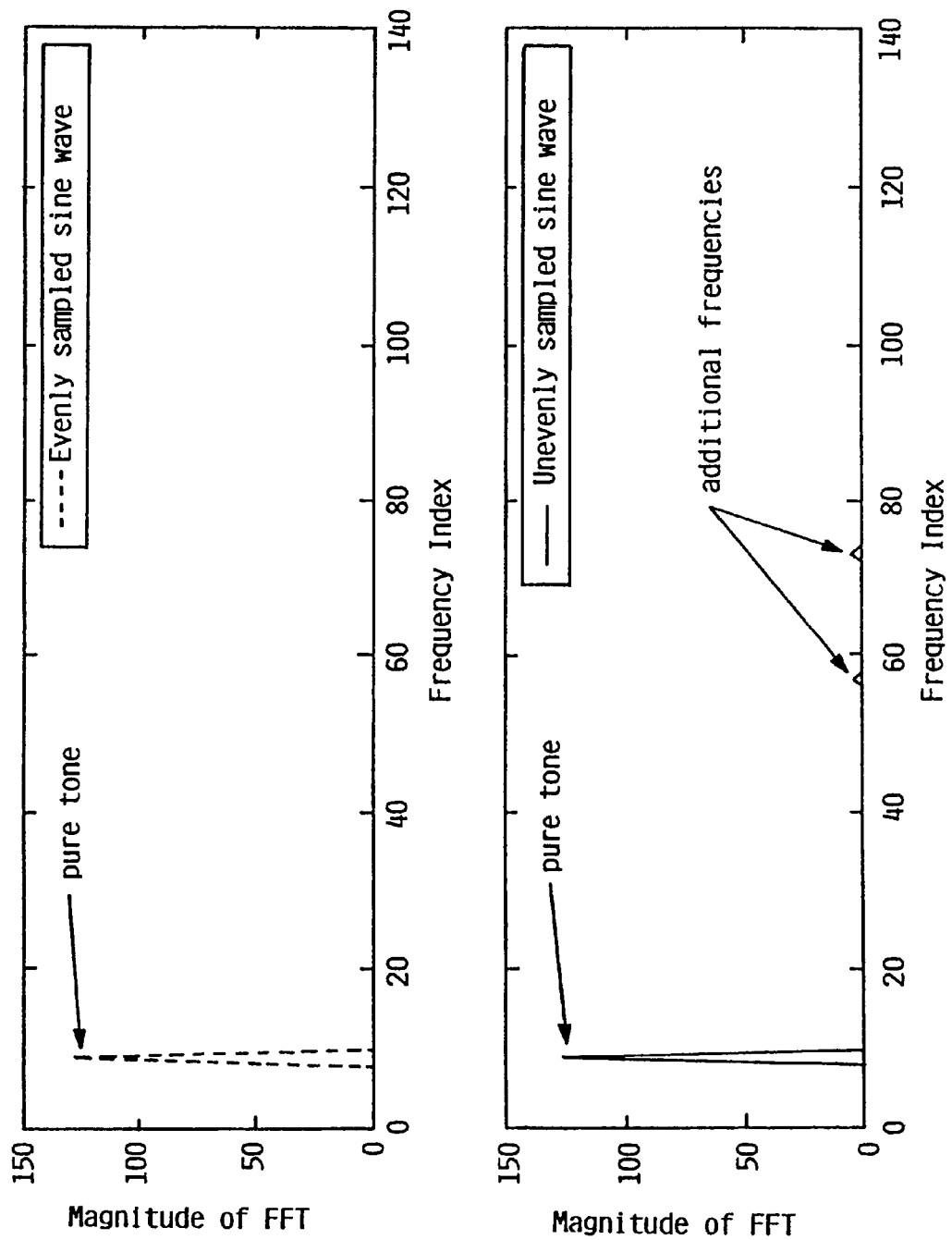
FIG. 4 is a set of two graphs of FFT magnitude versus frequency index for an evenly sampled sine wave and for an unevenly sampled sine wave showing the presence of additional frequencies in the latter.

FIG. 4 is a set of two graphs of FFT magnitude versus frequency index for an evenly sampled sine wave and for an unevenly sampled sine wave showing the presence of additional frequencies in the latter. In particular, the FFT for y and $y_{UE}$ is shown in FIG. 4. The top graph is the FFT of an evenly sampled sine wave, and as is apparent, there is only one non-zero frequency in the FFT. The bottom graph of FIG. 4 is the FFT of the $y_{UE}$ sequence. Note the presence of the additional frequencies (phantoms) in the FFT of $y_{UE}$ that are not seen, or expected, in the FFT of y. The presence and location of the additional frequencies is a direct consequence of the particular uneven pattern of sampling used. The presence of these frequencies verifies that an uneven sampling according to an aspect of the invention, has been used. These frequencies can be detected by using filters, for example, or other frequency selective means.

A method for generating an uneven sampling pattern as given in the above example will now be described with reference to Table 1.

In Table 1, the remapping procedure is given to take evenly spaced samples: $\{1, 16, 32 \ldots\}$ and create unevenly spaced samples: $\{3, 10, 26, \ldots\}$ given a particular uneven sampling pattern: $\{2 -6 -6 2\}$. The process is to take the original sample index and add the corresponding pattern value to it in order to create a new uneven sample index. The uneven sampling pattern is reused (or wrapped) so that it repeats after the last value. This is evident in Table 1 below.

TABLE 1

| m | Original Sample Index | Uneven Sampling Pattern | New Uneven Sample Index |
|---|---|---|---|
| \multicolumn{4}{c}{New Sample Index (m) = Original Sample Index (m) + Uneven Sampling Pattern (m)} | | | |
| 1 | 0 | 2 | 2 |
| 2 | 16 | −6 | 10 |
| 3 | 32 | −6 | 26 |
| 4 | 48 | 2 | 50 |
| 5 | 64 | 2 | 66 |
| 6 | 80 | −6 | 74 |
| 7 | 96 | −6 | 90 |
| 8 | 112 | 2 | 114 |

In Table 1 above, an evenly sampled waveform has evenly-spaced sample points at $\{0, 16, 32, \ldots\}$. To these values are added the uneven sampling pattern: $\{2,-6,-6,2\}$ which repeats as needed. The resulting sequence has unevenly spaced samples: $\{2, 10, 26, \ldots\}$.

The resulting unevenly sampled sequence may be returned to an evenly sampled sequence by first resampling the sequence at a higher rate, i.e., interpolation, followed by a decimation (down-sampling) to any desired rate. This process is shown in the flow diagram of FIG. 5.

Figure 5:
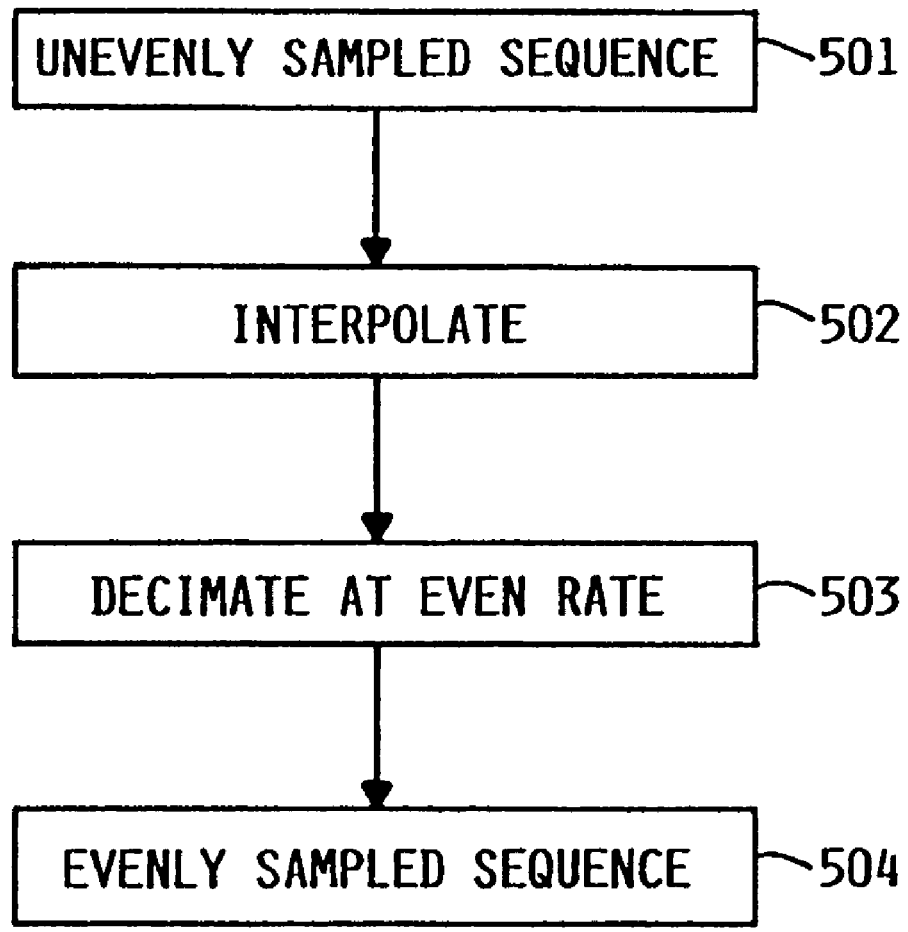
FIG. 5 is a flow diagram illustrating a process of resampling an unevenly sampled sequence which destroys any digital watermark created using uneven sampling.

FIG. 5 is a flow diagram illustrating a process of resampling an unevenly sampled sequence which destroys any digital watermark created using uneven sampling. The unevenly sampled sequence is provided in block 501. The unevenly sampled sequence is resample at a higher rate by an interpolation in block 502. Then a decimation (down-sampling) at an even rate is performed at block 503, resulting in an evenly sampled sequence at block 504. This resampling process thus destroys any digital watermark that has been created by uneven sampling.

An alternative embodiment for detecting a signal which has been sampled unevenly will now be described with reference to FIG. 6. If a signal which has been sampled unevenly is compared to the same signal which has been sampled evenly by using the absolute deviation between the samples of the sequences, one can determine if a detected signal has been sampled unevenly. The absolute deviation is computed by taking the absolute value of the difference between the amplitudes of two sequences for a given sample index.

Considering the two signals discussed in the previous example: y and $y_{UE}$, one can plot the absolute deviation between the two signals to discover the pattern used to encode the unevenness. Note that this method requires knowledge of the evenly sampled signal. (In the prior example of the first alternative embodiment, knowledge of the evenly sampled sequence was not required.)

Figure 6:
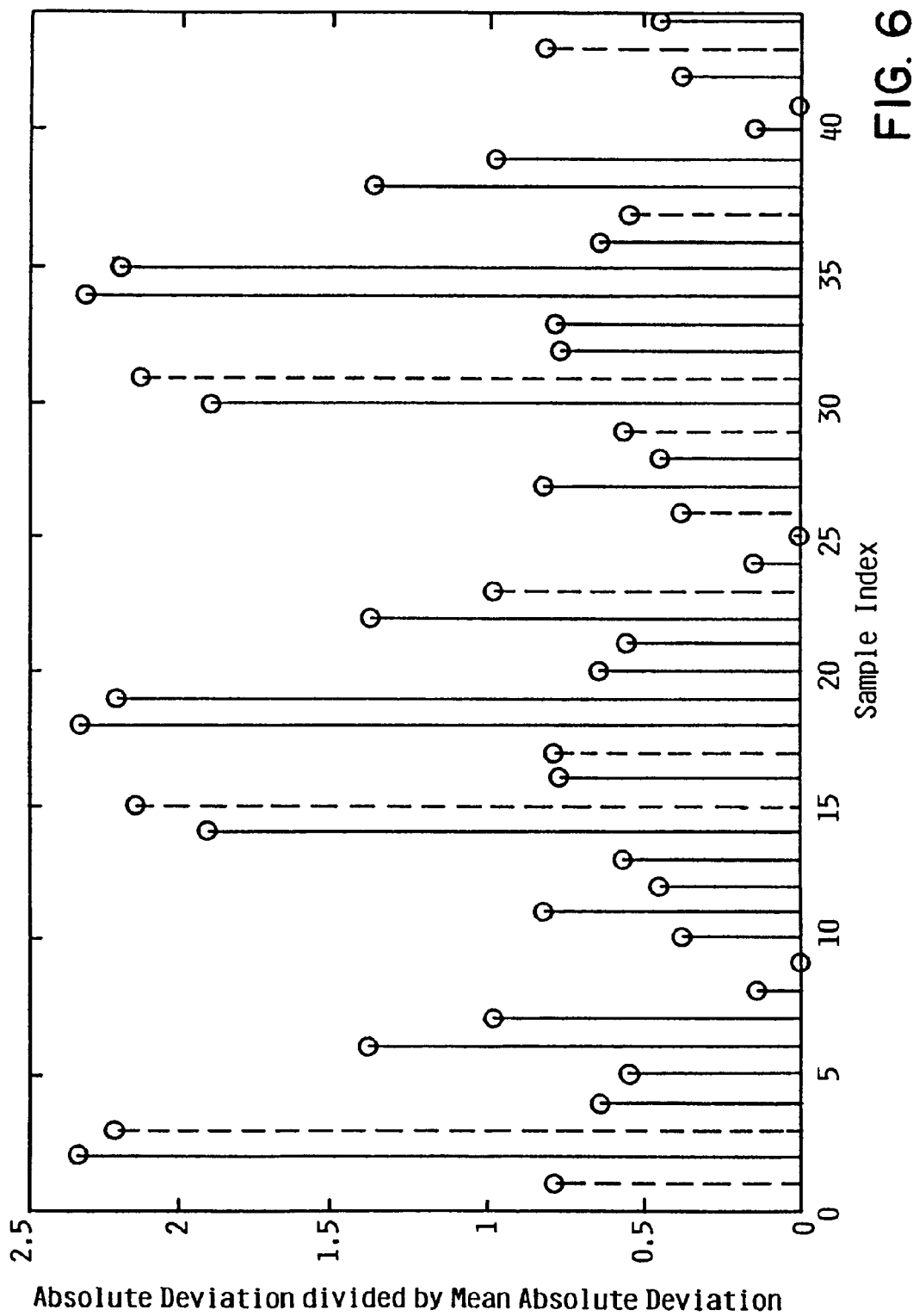
FIG. 6 is a plot of normalized deviation between an evenly sampled sine wave sequence and an unevenly sampled sequence both sequences having an amplitude of 1, for approximately two periods, used to verify a watermark according to an embodiment of the invention.

FIG. 6 is a plot of normalized deviation between an evenly sampled sine wave sequence and an unevenly sampled sequence both sequences having an amplitude of 1, for approximately two periods, used to verify a watermark according to an embodiment of the invention. In particular, in FIG. 6, a plot showing the absolute deviation of signals y and $y_{UE}$ (from the first example) is given. The absolute deviation has been normalized by dividing it by the mean absolute deviation. However, this normalization is not normally required and has included it here only for clarity in the plot.

Figure 7:
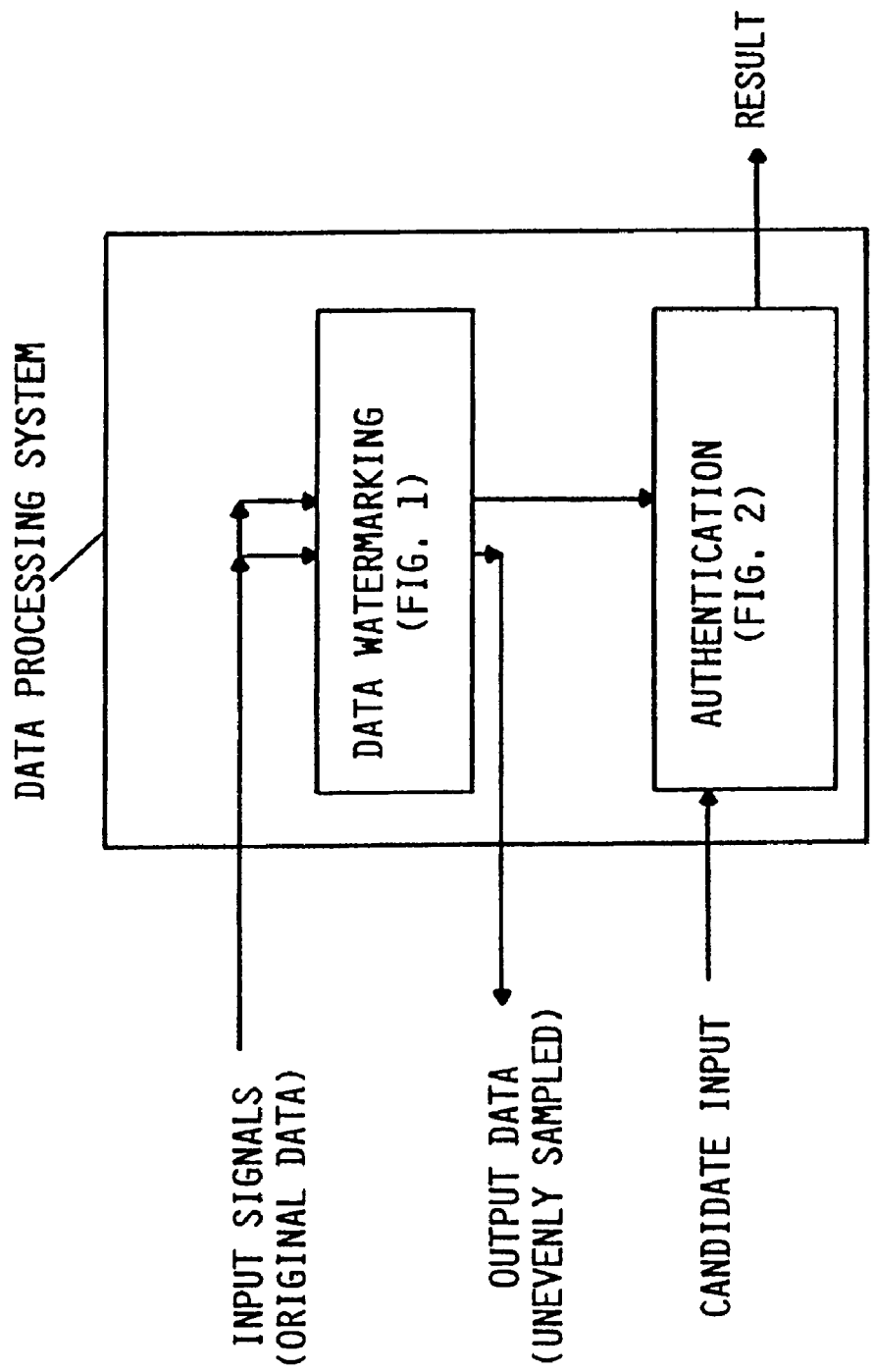
FIG. 7 is a block diagram of a data processing system implementing exemplary embodiments of a data watermarking and an authentication process according to the invention.

FIG. 7 is a block diagram of a data processing system implementing exemplary embodiments of data watermarking (FIG. 1) and authentication (FIG. 2) processing according to the invention.

The invention may be embodied as a computer program product. A computer program product includes a recording medium, such as a floppy disk, a high-capacity read only memory in the form of an optically read compact disc or CD-ROM, a tape, a transmission type media, such as a digital or analog communications link, or a similar computer program product.

It will be apparent to one skilled in the art that the manner of making and using the claimed invention has been adequately disclosed in the above-written description of the preferred embodiment(s) taken together with the drawings.

It will be understood that the above described preferred embodiment(s) of the present invention are susceptible to various modifications, changes, and adaptations, and the same are intended to be comprehended within the meaning and range of equivalents of the appended claims.

Further, although a number of equivalent components may have been mentioned herein which could be used in place of the components illustrated and described with reference to the preferred embodiment(s), this is not meant to be an exhaustive treatment of all the possible equivalents, nor to limit the invention defined by the claims to any particular equivalent or combination thereof. A person skilled in the art would realize that there may be other equivalent components presently known, or to be developed, which could be used within the spirit and scope of the invention defined by the claims.

What is claimed is:

1. A method of authentication of candidate data comprising:
    sampling, using an analog-to-digital (A/D) converter, original signals representing a work using an uneven sampling rate to produce unevenly sampled original signal data;
    comparing, using a mean square difference (MSD) unit, the unevenly sampled original signal data with the candidate data for a degree of match; and
    determining whether the candidate data is authentic based on the degree of match wherein the determining step comprises checking whether the candidate data contains a correct watermark present in the candidate data only if the candidate data is authentic and was created using the same uneven sampling rate used in the sampling step by examining the degree of match as represented by a mean square difference (MSD) produced by the mean square difference (MSD) unit, and wherein the candidate data is determined to be authentic if the correct watermark is found to be present in the candidate data as indicated by the mean square difference (MSD) being small.

2. The method according to claim 1, wherein the comparing step is performed for the purpose of determining whether the candidate data is authentic and not for the purpose of synchronization.

3. The method according to claim 1, wherein the sampling step comprises sampling using a pseudo-random sampling rate.

4. An apparatus for authentication of candidate data comprising:
    an analog-to-digital (A/D) converter that samples original signals using an uneven sampling rate to produce unevenly sampled original signal data; and
    a data processing system that compares the unevenly sampled original signal data with the candidate data for a degree of match and that determines whether the candidate data is authentic based on the degree of match wherein the data processing system checks whether the candidate data contains a correct watermark present in the candidate data only if the candidate data is authentic and was created using the same uneven sampling rate used by the analog-to-digital (A/D) converter to produce the unevenly sampled original signal data by examining the degree of match as represented by a mean square difference (MSD), and wherein the candidate data is determined to be authentic if the correct watermark is found to be present in the candidate data as indicated by the mean square difference (MSD) being small.

5. The apparatus according to claim 4, wherein the data processing system performs the comparison function for the purpose of determining whether the candidate data is authentic and not for the purpose of synchronization.

6. The apparatus according to claim 4, further comprising:
    a pseudo-random number generator operatively coupled to the analog-to-digital (A/D) converter to provide the uneven sampling rate.

7. The apparatus according to claim 4, wherein the data processing system comprises a mean square difference (MSD) unit.

8. A computer readable storage medium encoded with computer executable instructions that when executed by the computer result in the implementation of a method for authenticating candidate data comprising:
    sampling original signals representing a work using an uneven sampling rate to produce unevenly sampled original signal data;
    comparing the unevenly sampled original signal data with the candidate data for a degree of match; and
    determining whether the candidate data is authentic based on the degree of match, wherein the determining step comprises checking whether the candidate data contains a correct watermark present in the candidate data only if the candidate data is authentic and was created using the same uneven sampling rate used in the sampling step by examining the degree of match as represented by a mean square difference (MSD), and wherein the candidate data is determined to be authentic if the correct watermark is found to be present in the candidate data as indicated by the mean square difference (MSD) being small.

9. The computer readable storage medium according to claim 8, wherein the sampling step comprises sampling using a pseudo-random sampling rate.

* * * * *